US012696847B2

(12) United States Patent
Wang

(10) Patent No.: US 12,696,847 B2
(45) Date of Patent: Aug. 4, 2026

(54) GARDEN TOOL

(71) Applicant: Greenworks (Jiangsu) Co., Ltd.,
Changzhou (CN)

(72) Inventor: Chaoyi Wang, Changzhou (CN)

(73) Assignee: Greenworks (Jiangsu) Co., Ltd.,
Changzhou (CN)

( * ) Notice: Subject to any disclaimer, the term of this
patent is extended or adjusted under 35
U.S.C. 154(b) by 371 days.

(21) Appl. No.: 18/473,309

(22) Filed: Sep. 25, 2023

(65) Prior Publication Data

US 2024/0107953 A1 Apr. 4, 2024

(30) Foreign Application Priority Data

Sep. 30, 2022 (CN) .......................... 202222600380.5

(51) Int. Cl.
*A01G 3/06* (2006.01)
(52) U.S. Cl.
CPC .................................... *A01G 3/062* (2013.01)
(58) Field of Classification Search
CPC .................................. A01G 3/06; A01G 3/062
USPC ...................................................... 172/13, 15
See application file for complete search history.

(56) References Cited

U.S. PATENT DOCUMENTS 3,221,481 A * 12/1965 Mattson et al. ....... A01D 34/84
56/16.9
4,043,101 A * 8/1977 Lahr et al. ............. A01G 3/062
56/17.1
4,756,148 A * 7/1988 Gander et al. ......... A01D 34/84
172/17

9,107,352 B2 * 8/2015 Stark et al. ............ A01G 3/062
11,219,159 B2 1/2022 Yuan et al.
2016/0143219 A1 5/2016 Yuan et al.
2022/0266437 A1 8/2022 Silorio et al.

FOREIGN PATENT DOCUMENTS

CN 212794851 U 3/2021
CN 214430197 U 10/2021
CN 215073965 U 12/2021
CN 113305788 B 9/2022
DE 10318324 A1 * 10/2004 ............. A01G 3/062
EP 1302097 A2 * 4/2003 ............. A01G 3/062

OTHER PUBLICATIONS

Eberhardt et al., "Portable Hand-guided Edge Cutter Has Two
Wheels Either Side of Gear Housing and Coaxial Relative to Output
Shaft to Protect Gear Housing From Wear on Ground" (DE 10318324
A1), machine translation. (Year: 2004).*

* cited by examiner

*Primary Examiner* — Tara Mayo

(57) ABSTRACT

The disclosure provides a garden tool, which includes a
control assembly, a working head and a connecting rod
connecting the control assembly and the working head. The
working head includes a housing and a cover, and the
connecting rod is connected with the housing. The connect-
ing rod is provided with a power cable extending into the
housing and connected with the control assembly. An
accommodating cavity is formed in the housing, and an
opening of the accommodating cavity may be detachable
connected with the cover. A motor is accommodated in the
accommodating cavity, the motor is fixedly connected with
the cover, a blade is arranged in the cover, and a motor shaft
part of the motor extends into the cover and is fixedly
connected with the blade. The motor is provided with a
motor wire that is pluggably connected with the power
cable.

8 Claims, 6 Drawing Sheets

100
102
101

_100_

116

115

114

113

112

112

111

12

10

14

GARDEN TOOL

CROSS REFERENCE TO RELATED APPLICATION

The present application claims the priority of the following Chinese patent applications: serial No. 202222600380.5, filed Sep. 30, 2022; the disclosure of which is hereby incorporated by reference herein in its entirety for all purposes.

TECHNICAL FIELD

The disclosure relates to an edger, which belongs to a field of garden tools.

BACKGROUND

The edger is specially used to trim the edge of the lawn along a curb. It can not only trim the lawn but also improve the aesthetics of the lawn.

Traditional edgers can remove weeds and cut grooves, but when working outdoors for a long time, the motor of the edger easily heats up, and in complex outdoor environments, rain, dust or debris can easily enter the edger along the heat dissipation holes of the motor, which causes the motor to malfunction easily. Moreover, the motor cannot be quickly disassembled when maintenance, which enables it to be difficult to further improve work efficiency.

In view of this, it is necessary to propose a garden tool to solve the above problems.

SUMMARY

The disclosure provides a garden tool to solve a problem of heat dissipation.

The disclosure provides the garden tool, which includes a control assembly, a working head and a connecting rod connecting the control assembly and the working head. The working head includes a housing and a cover, and the connecting rod is connected with the housing. A power cable is provided in the connecting rod extending into the housing and connected with the control assembly. An accommodating cavity is formed in the housing, and an opening of the accommodating cavity may be detachable connected with the cover. A motor is provided in the accommodating cavity, the motor is fixedly connected with the cover, a blade is arranged in the cover, and a motor shaft of the motor partially extends into the cover and is fixedly connected with the blade. The motor is provided with a motor wire that is pluggably connected with the power cable.

In an embodiment of the disclosure, the housing is further provided with a clamping plate, and the clamping plate is provided with a cable locking part configured to fix the power cable.

In an embodiment of the disclosure, both sides of the clamping plate are provided with a first sliding groove in a horizontal direction, a protruding rib coupled with the first sliding groove is formed in the housing, and the first sliding groove is capable of sliding relative to the protruding rib to enable the clamping plate to be mounted into the housing along the protruding rib.

In an embodiment of the disclosure, the motor further includes a casing, a fixing component, a rotating component and a bracket, the fixing part, the rotating component and the bracket are all housed in the casing, the bracket is fixedly connected with the cover, the bracket is sleeved on an outside of the motor shaft, the motor shaft is capable of rotating relative to the bracket, the fixing component surrounds the bracket and is fixedly connected with the bracket, the rotating component surrounds the fixing component and is fixedly arranged on an inner wall of the casing, and the housing is fixedly connected with the motor shaft.

In an embodiment of the disclosure, a fan is further provided between the casing and the motor shaft, an outer peripheral part of the fan is fixedly connected with the inner wall of the casing, and a rotation center of the fan is connected with the motor shaft and is capable of rotating synchronously with motor shaft.

In an embodiment of the disclosure, the fan is a centrifugal fan.

In an embodiment of the disclosure, an inner side wall of a top of the housing is provided with at least two deflector plates, the deflector plate is arranged in an arc shape, and the at least two deflector plates are arranged to form passages for air to flow between adjacent deflector plates and between the deflector plate and a side wall of the housing.

In an embodiment of the disclosure, a distance between the fan and the top of the housing is less than a height of the deflector plate extending downward from the top of the housing.

In an embodiment of the disclosure, the clamping plate is arranged on an outside of the housing, two ends of the clamping plate respectively abut the deflector plate and the cover, an air inlet is arranged in the clamping plate, air flow generated by the fan flows out through the deflector plate, flows into the motor through the air inlet, then flows through the fixing component and then returns back to the fan to complete a cycle.

In an embodiment of the disclosure, the cover is provided with a first surface to mount the bracket and a second surface arranged around the first surface, and a plurality of concave holes distributed in an array are formed on the second surface.

Beneficial effects of the disclosure are that it only needs to remove the cover to take out the motor, which shortens maintenance time and improve efficiency.

DETAILED DESCRIPTION

Figure 1:
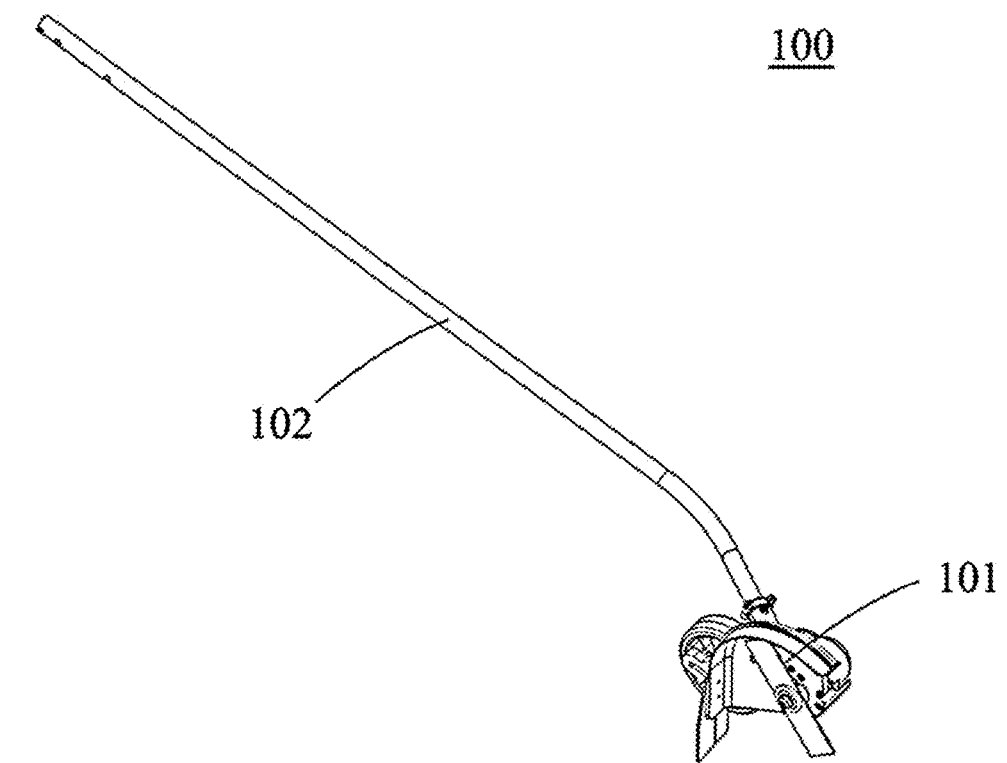
FIG. 1 is a partial schematic structural view of a garden tool of the disclosure.

In order to enable a purpose, technical solutions and advantages of the disclosure to be clearer, the disclosure will be described in detail below with reference to drawings and specific embodiments.

It should be noted that, in order to avoid obscuring the disclosure with unnecessary details, only structures and/or processing steps closely related to the solution of the disclosure are shown in the drawings, while other details that are not closely related to the disclosure are omitted.

Additionally, it should be noted that a term "comprises", "includes" or any other variation thereof is intended to cover a non-exclusive inclusion such that a process, method, article or apparatus including a set of elements includes not only those elements, but also other elements not expressly listed, or elements inherent to the process, method, article, or apparatus.

Please refer to FIG. 1 through FIG. 10. The disclosure provides a garden tool. The garden tool may be an edger 100, which will not be described in detail will not be subject to any limitations. For clarity of description, a specific structure of an edger 100 will be described in detail in a following description.

The edger 100 includes a control assembly (not shown), a working head 101 and a connecting rod 102. The control assembly is capable of operating and controlling the edger 100. The connecting rod 102 is used to connect the control assembly and the working head 101, and the control assembly and the working head 101 are respectively arranged at both ends of the connecting rod 102. The control assembly is further provided with a power supply. The power supply is provided with a power cable passing through the connecting rod 102 and connected with the working head 101. The power supply is used to supply power to the working head 101 and drive the working head 101 to perform operations.

Figure 2:
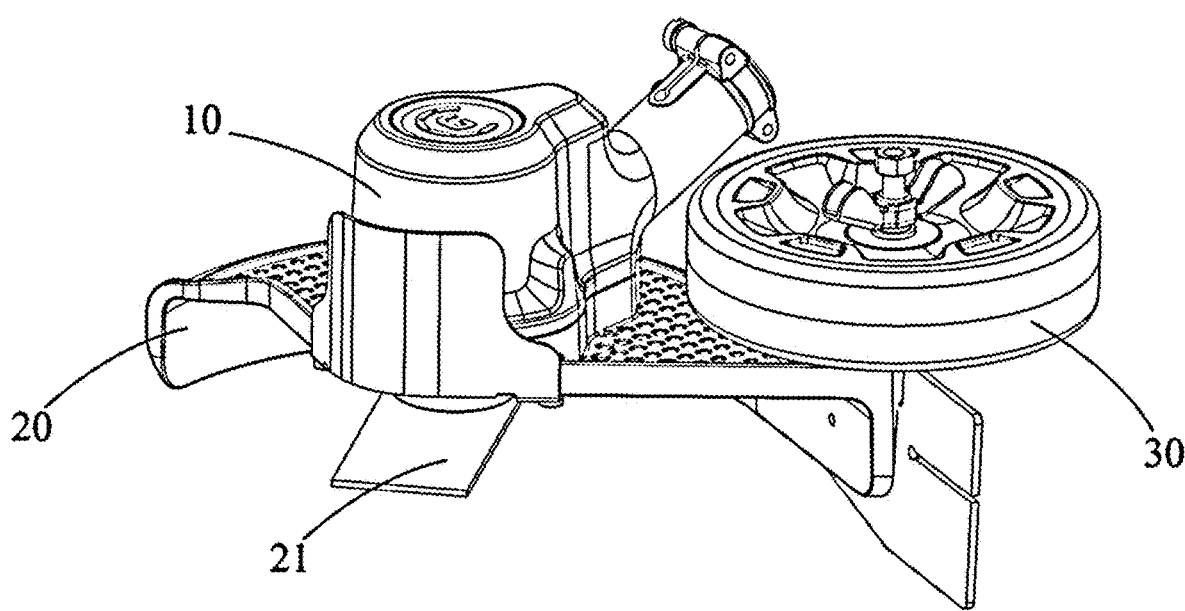
FIG. 2 is a schematic structural view of a working head of the garden tool of the disclosure.
Figure 3:
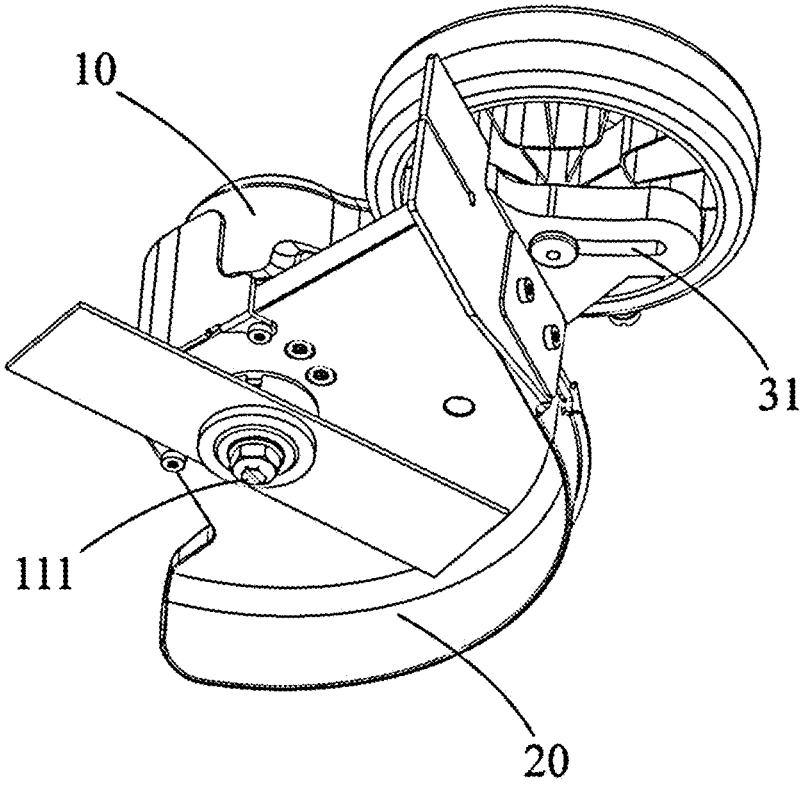
FIG. 3 is a second schematic structural view of the working head of the garden tool of the disclosure from another angle.
Figure 4:
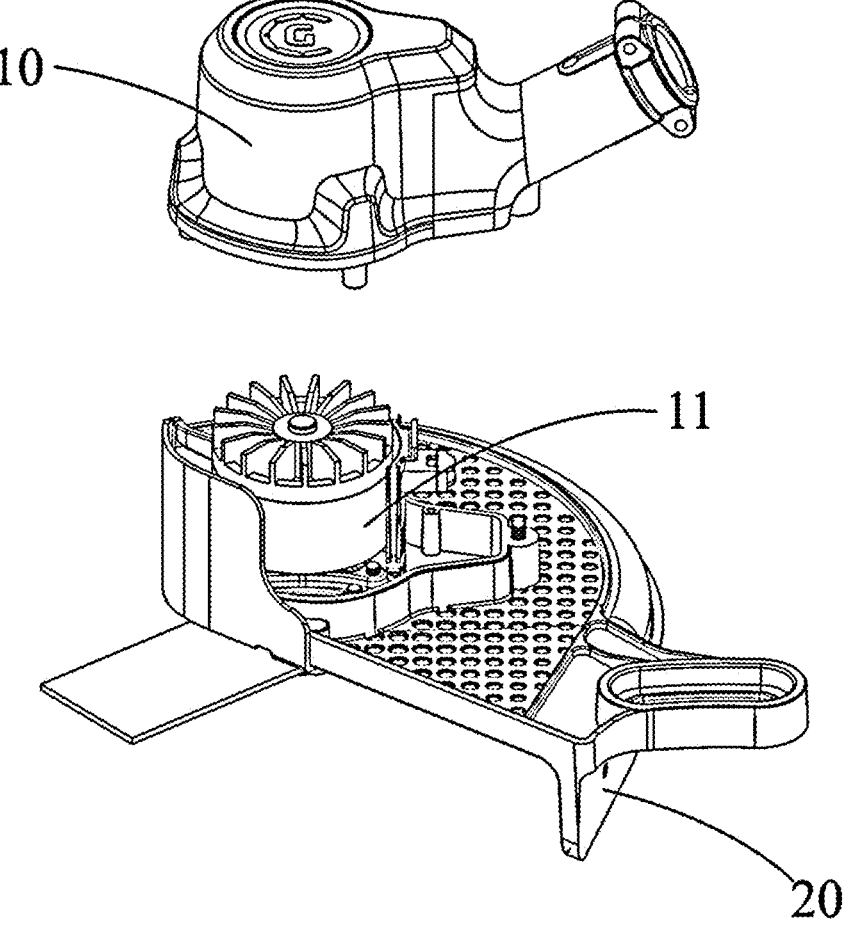
FIG. 4 is an exploded structural schematic view of the working head of the garden tool of the disclosure.

Please refer to FIG. 2 through FIG. 4. The working head 101 includes a housing 10 and a cover 20. The housing 10 is provided with an accommodating cavity, and a motor 11 is accommodated in the accommodating cavity. The motor 11 is provided with a motor wire connected with the power cable. The housing 10 is fixedly connected with the connecting rod 102. The cover 20 is provided with a blade 21 for cutting. A motor shaft 111 of the motor 11 extends outward from an opening of the accommodating cavity, so that the housing 10 is connected with the cover 20, and the motor shaft 111 of the motor 11 partially extends to the cover 20 so as to drive the blade 21 to perform operations.

Furthermore, in order to facilitate a disassembly of the motor 11 in the housing 10, the motor 11 in the accommodating cavity is fixedly connected with the cover 20, which means that when the housing 10 and the cover 20 are disassembled and separated, the motor 11 can be taken out of the housing 10 with the cover 20. In some embodiments, the motor wire and the power cable are connected in a pluggable way, so that the motor 11 can be easily powered off after being taken out, and can be easily mounted again.

Figure 5:
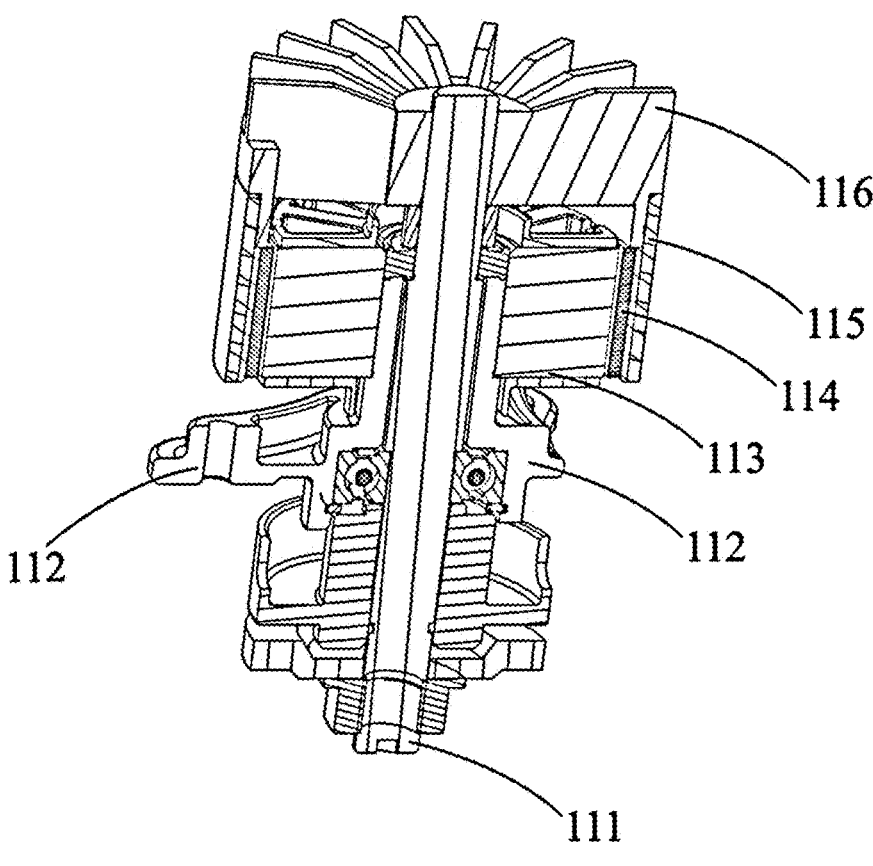
FIG. 5 is a schematic structural view of a motor of the garden tool of the disclosure.
Figure 7:
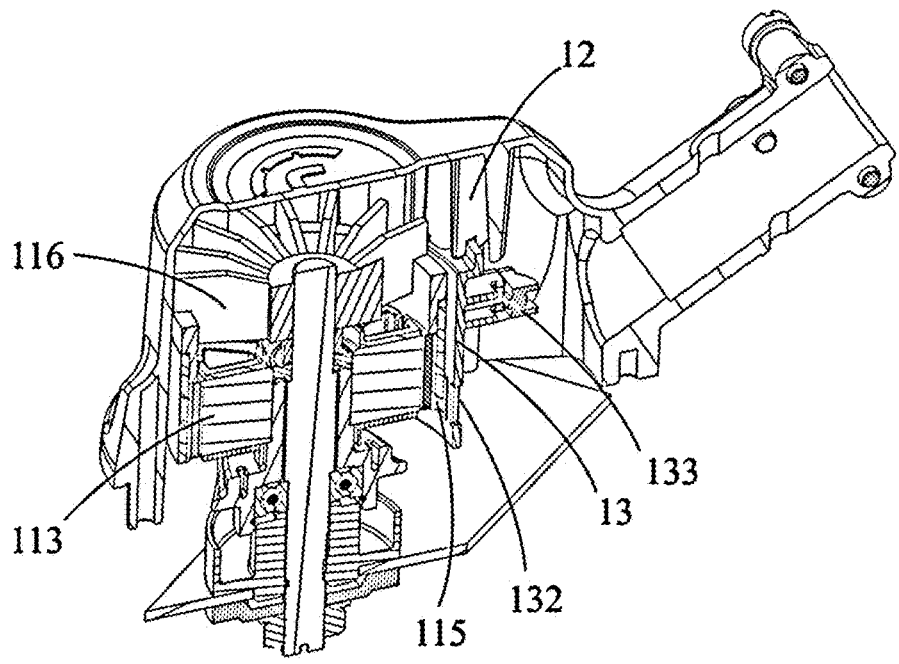
FIG. 7 is a partial cross-sectional structure schematic view of the working head of the garden tool of the disclosure.

Please refer to FIG. 5 and FIG. 7. Specifically, the motor 11 further includes a casing 115, a fixing component 113, a rotating component 114 and a bracket 112. The fixing component 113, the rotating component 114 and the bracket 112 are all accommodated in the casing 115. The motor shaft 111, the bracket 112, the fixing component 113, the rotating component 114 and the casing 115 are arranged in sequence from an inside to the outside. The bracket 112 is sleeved on an outside of the motor shaft 111 and the motor shaft 111 can rotate relative to the bracket 112. It may be understood that a bearing may further be arranged between the motor shaft 111 and the bracket 112. A number of the bearings is not limited, an inner ring of the bearing is fixedly connected with the motor shaft 111, and an outer ring of the bearing is fixedly connected with the bracket 112. It should be noted that the fixed component 113 is an electromagnetic coil, and the rotating component 114 is a magnet.

The fixing component 113 surrounds the bracket 112 and is fixedly connected with the bracket 112. The bracket 112 is fixedly connected with the cover 20, so that the entire motor 11 is fixed to the cover 20. In some embodiments, the bracket 112 is fixed to the cover 20 through three fasteners.

The rotating component 114 is fixedly arranged on an inner wall of the casing 115 around the fixing component 113, and the casing 115 is fixedly connected with the motor shaft 111. With this arrangement, the fixing component 113 and the bracket 112 are stationary relative to the cover 20, and the rotating component 114 rotates around the fixing component 113 and drives the casing 115 and the motor shaft 111 to rotate. Since the motor 11 is not physically connected with the housing 10, the casing 115 can rotate in the accommodating cavity.

In an embodiment of the disclosure, in order to further enhance a heat dissipation of the motor 11, a fan 116 is provided between the casing 115 and the motor shaft 111, the fan 116 is provided with a plurality of radially distributed fan blades, and the casing 115 is fixedly connected with the motor shaft 111 through the fan blade, which means that a rotation center of the fan 116 is connected with the motor shaft 111 and can rotate synchronously with the motor shaft 111. An outer periphery of the fan 116 is fixedly connected with the inner wall of the casing 115.

It should be noted that the fan 116 is a centrifugal type, and the fan 116 can discharge airflow which is in an extending direction of the motor shaft 111 along a radial direction. Therefore, the fan blade is fixed to the casing 115, a gap is formed between adjacent fan blades at an upper end of the housing 115 for the airflow to flow out.

Figure 6:
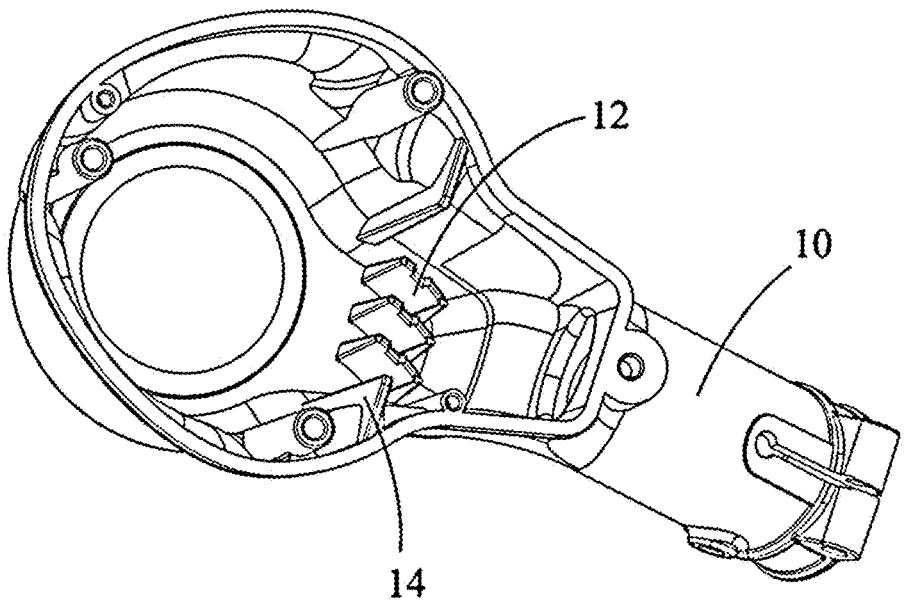
FIG. 6 is a schematic structural view of a housing of the garden tool of the disclosure.

Please refer to FIG. 6. Further, a deflector plate 12 is arranged on an inner wall of a top of the housing 10. The deflector plate 12 extends downward from the top of the housing 10. The deflector plate 12 are arranged in an arc shape and at least two deflector plates 12 are arranged to form a passage for air to flow between the adjacent deflector plates 12 and between the deflector plates 12 and a side wall of the housing 10. In particular, a distance between the fan 116 and the top of the housing 10 is less than a height of the deflector plate 12 which is extending downward from the top of the housing 10. This arrangement allows the airflow of the fan 116 to flow from between the fan blades into between the deflector plates 12 when flowing in a horizontal direction.

Figure 8:
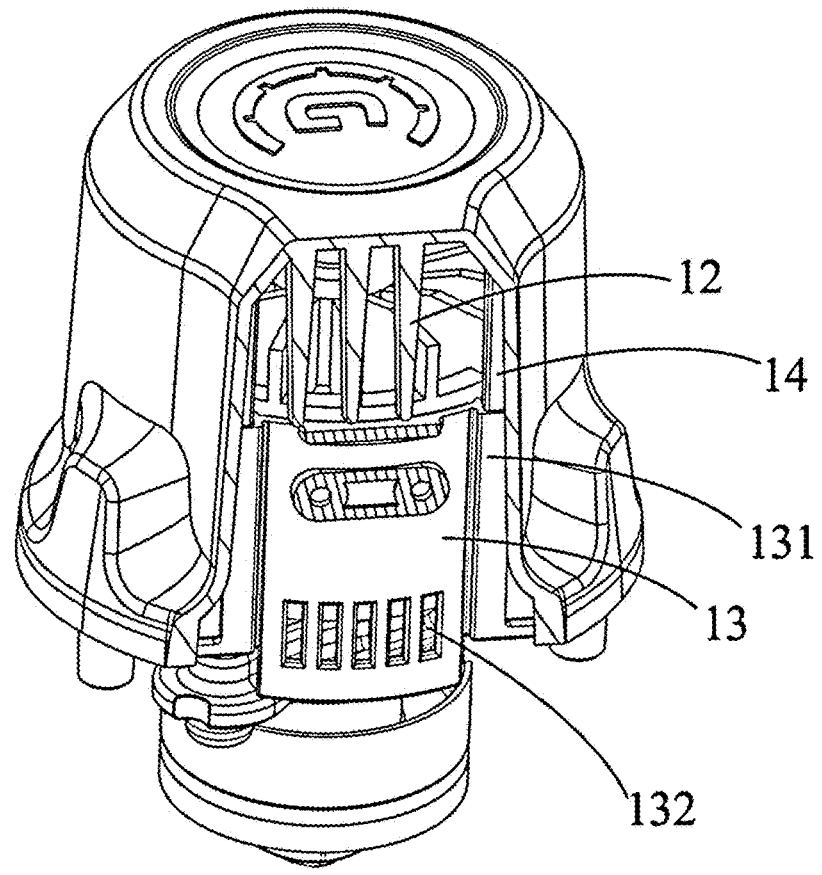
FIG. 8 is a second partial cross-sectional structure schematic view of the working head of the garden tool of the disclosure from another angle.
Figure 10:
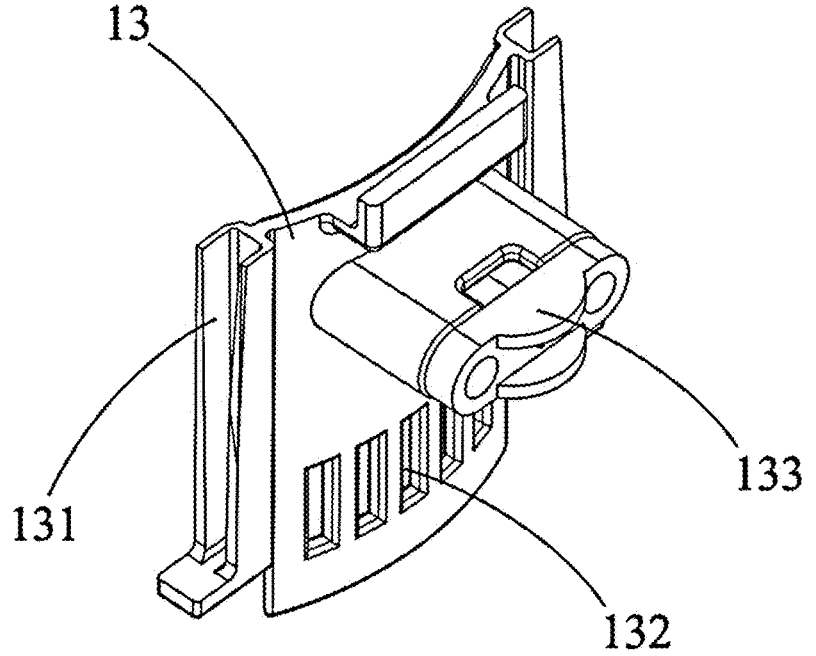
FIG. 10 is a schematic structural view of a clamping plate of the garden tool of the disclosure.

Please refer to FIG. 7, FIG. 8 and FIG. 10. In order to further circulate the air flow, the housing 10 is further provided with a clamping plate 13. Both sides of the clamping plate 13 are provided with first sliding grooves 131 in the horizontal direction. A protruding rib 14 matched with the first sliding groove 131 is formed in the housing 10, and the first sliding groove 131 can slide relative to the protruding rib 14, so that the clamping plate 13 is mounted into the housing 10 along the protruding rib 14. The clamping plate 13 is arranged on an outside of the casing 115, and upper and lower ends of the clamping plate 13 in a vertical direction abut the deflector plate 12 and the cover 20 respectively. With this arrangement, the clamping plate 13 is equivalent to dividing a space where the motor 11 is located, so that the air generated by the fan 116 can only flow out from the gap between the deflector plates 12.

In addition, the clamping plate 13 is further provided with an air inlet 132 for a return flow of air. The airflow generated by the fan 116 flows out through the deflector plates 12 and then flows into the motor 11 through the air inlet 132, after flowing through the fixing component 113, heat generated on the fixing component 113 can be taken away and flow back to the fan 116 to complete a cycle. It may be understood that the air will continuously contact inner walls of the housing 10 and the cover 20 during the cycle, thereby completing a heat exchange.

Figure 9:
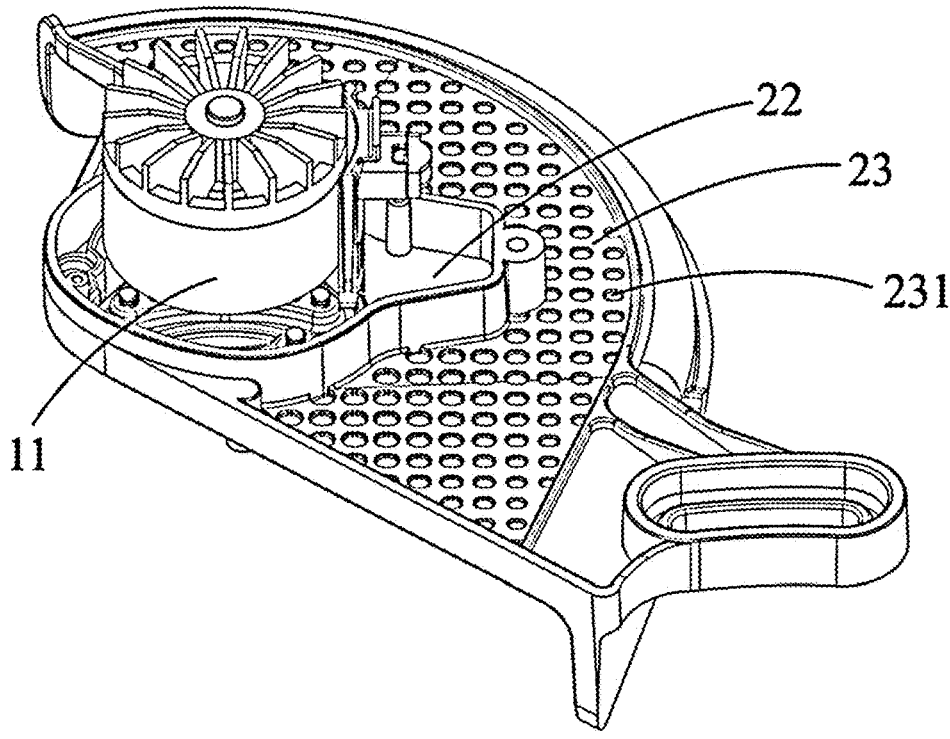
FIG. 9 is a structural schematic view of removing the housing of the garden tool of the disclosure.

Please refer to FIG. 9. In another embodiment of the disclosure, the cover 20 is provided with a first surface 22 for mounting the bracket 112 and a second surface 23 surrounding the first surface 22. A plurality of concave holes 231 distributed in an array are formed on the second surface 23. The concave hole 231 can increase a surface area in contact with the air, and heat conducted through the cover 20 can be dissipated through the concave hole 231. Of course, the concave hole 231 may also be a protruding structure, as long as the surface area can be increased and may be specifically configured according to needs, which is not limited here.

Furthermore, the clamping plate 13 is further provided with a cable locking part 133, which is used to fix the power cable and fix the power cable between the cable locking part 133 and the clamping plate 13 in order to prevent the power cable from being entangled or being pulled when the motor 11 is disassembled.

In other embodiments of the disclosure, the cover 20 is further provided with a guiding wheel 30, the guiding wheel 30 is pivotally connected with the cover 20 through a rotating shaft, and the cover 20 is further provided with a second sliding groove 31 for the rotating shaft to slide, so that the guiding wheel 30 can slide in the radial direction.

In summary, the disclosure only needs to disassemble the cover 20 to take out the motor 11, which shortens maintenance time and improves efficiency. At the same time, through a self-circulation and arranging concave holes 231 on the cover 20 to assist the heat dissipation, there is no need to arrange heat dissipation holes on the housing 10, which can enhance a sealing performance of the housing 10.

The above embodiments are only used to illustrate the technical solutions of the disclosure and are not limiting. Although the disclosure has been described in detail with reference to the preferred embodiments, those of ordinary skill in the art should understand that the technical solutions of the disclosure may be modified or equivalent substituted without departing from a scope of the technical solution of the disclosure.

What is claimed is:

1. A garden tool, comprising:
a control assembly;
a working head; and
a connecting rod, connecting the control assembly and the working head; wherein
the working head comprises a housing and a cover, the connecting rod is connected with the housing, a power cable is provided in the connecting rod extending into the housing and connected with the control assembly, an accommodating cavity is formed in the housing, an opening of the accommodating cavity is detachable connected with the cover, a motor is provided in the accommodating cavity, the motor is fixedly connected with the cover, a blade is arranged in the cover, a motor shaft of the motor partially extends into the cover and is fixedly connected with the blade, and the motor is provided with a motor wire that is pluggably connected with the power cable;

the housing is further provided with a clamping plate, and the clamping plate is provided with a cable locking part configured to fix the power cable, both sides of the clamping plate are provided with a first sliding groove in a horizontal direction, a protruding rib coupled with the first sliding groove is formed in the housing, and the first sliding groove is capable of sliding relative to the protruding rib to enable the clamping plate to be mounted into the housing along the protruding rib.

2. The garden tool according to claim 1, wherein the motor further comprises a casing, a fixing component, a rotating component and a bracket, the fixing part, the rotating component and the bracket are all housed in the casing, the bracket is fixedly connected with the cover, the bracket is sleeved on an outside of the motor shaft, the motor shaft is capable of rotating relative to the bracket, the fixing component surrounds the bracket and is fixedly connected with the bracket, the rotating component surrounds the fixing component and is fixedly arranged on an inner wall of the casing, and the housing is fixedly connected with the motor shaft.

3. The garden tool according to claim 2, wherein a fan is further provided between the casing and the motor shaft, an outer peripheral part of the fan is fixedly connected with the inner wall of the casing, and a rotation center of the fan is connected with the motor shaft and is capable of rotating synchronously with motor shaft.

4. The garden tool according to claim 3, wherein the fan is a centrifugal fan.

5. The garden tool according to claim 3, wherein an inner side wall of a top of the housing is provided with at least two deflector plates, the deflector plate is arranged in an arc shape, and the at least two deflector plates are arranged to form passages for air to flow between adjacent deflector plates and between the deflector plate and a side wall of the housing.

6. The garden tool according to claim 5, wherein a distance between the fan and the top of the housing is less than a height of the deflector plate extending downward from the top of the housing.

7. The garden tool according to claim 5, wherein the clamping plate is arranged on an outside of the housing, two ends of the clamping plate respectively abut the deflector plate and the cover, an air inlet is arranged in the clamping plate, air flow generated by the fan flows out through the deflector plate, flows into the motor through the air inlet, then flows through the fixing component and then returns back to the fan to complete a cycle.

8. The garden tool according to claim 2, wherein the cover is provided with a first surface to mount the bracket and a second surface arranged around the first surface, and a plurality of concave holes distributed in an array are formed on the second surface.

* * * * *